(12) United States Patent
Huang et al.

(10) Patent No.: US 7,845,707 B2
(45) Date of Patent: Dec. 7, 2010

(54) VEHICLE CLOSURE ASSEMBLY WITH SHAPE MEMORY POLYMER SEAL

(75) Inventors: Yueh-Se J. Huang, Ann Arbor, MI (US); Houng Yue Chang, Canton, MI (US); Phillip M. Turner, Montrose, MI (US); Pei-Chung Wang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 310 days.

(21) Appl. No.: 12/046,658

(22) Filed: Mar. 12, 2008

(65) Prior Publication Data

US 2009/0230723 A1    Sep. 17, 2009

(51) Int. Cl.
    B60J 10/08    (2006.01)
(52) U.S. Cl. .............. 296/146.9; 49/477.1; 52/2.14; 277/628; 277/644; 277/645; 277/646
(58) Field of Classification Search .......... 49/477.1, 49/480.1; 52/2.14, 741.4; 277/545, 553, 277/605, 628, 644, 645, 646, 931, 932, 933; 296/107.04, 146.9, 212
    See application file for complete search history.

(56) References Cited

U.S. PATENT DOCUMENTS

| | | | | |
|---|---|---|---|---|
| 3,542,375 A * | 11/1970 | Renwick | ........... | 277/646 |
| 4,579,192 A * | 4/1986 | Mueller | ........... | 277/312 |
| 4,761,917 A * | 8/1988 | Knecht et al. | ........... | 49/477.1 |
| 5,012,615 A * | 5/1991 | Piccinini et al. | ........... | 49/477.1 |
| 6,098,992 A * | 8/2000 | Long et al. | ........... | 277/637 |
| 6,702,301 B1 * | 3/2004 | Davies et al. | ........... | 277/646 |
| 6,846,034 B1 * | 1/2005 | Angus et al. | ........... | 296/146.9 |
| 6,966,601 B2 * | 11/2005 | Matsumoto et al. | ........... | 296/146.2 |
| 7,484,735 B2 * | 2/2009 | Verbrugge et al. | ........... | 277/628 |
| 2004/0100035 A1 | 5/2004 | Turnquist | | |
| 2005/0198904 A1 | 9/2005 | Browne | | |
| 2005/0199440 A1 | 9/2005 | Keefe | | |
| 2005/0206095 A1 | 9/2005 | Keefe | | |
| 2005/0206096 A1 | 9/2005 | Browne | | |
| 2005/0212304 A1 | 9/2005 | Herrera | | |
| 2005/0230925 A1 | 10/2005 | Browne | | |
| 2005/0275243 A1 | 12/2005 | Browne | | |
| 2009/0255187 A1 * | 10/2009 | Alexander et al. | ........... | 49/477.1 |

* cited by examiner

*Primary Examiner*—Glenn Dayoan
*Assistant Examiner*—Paul A Chenevert
(74) *Attorney, Agent, or Firm*—Quinn Law Group, PLLC (57) ABSTRACT

A closure assembly with a shape memory polymer seal is provided for use with a vehicle. The closure assembly includes a frame member configured for attachment to the vehicle body to selectively transition from a closed position to an open position. The seal structure includes a base portion elongated along and attached to a peripheral edge of the frame member or the vehicle body, and a flexible contact portion extending integrally from the base portion and configured for sealing communication with an opposing surface. A thermally-activated smart material (TASM), namely a shape memory polymer member, is disposed inside a cavity within the contact portion. A thermoelectric device is in thermal communication with the TASM, and is characterized by a thermal differential when current flows therethrough. The TASM is activated in response to the thermal differential of the thermoelectric device, thereby altering at least one physical property of the TASM.

14 Claims, 4 Drawing Sheets

VEHICLE CLOSURE ASSEMBLY WITH SHAPE MEMORY POLYMER SEAL

TECHNICAL FIELD

The present invention relates generally to door assemblies for motorized vehicles, and more particularly to seals or strips for use with vehicle door assemblies to provide a weather resistant closure and mitigate occupant perceptible exterior vehicle noise.

BACKGROUND OF THE INVENTION

Most conventional motor vehicle closure assemblies are provided with a seal structure or weather strip intended to prevent the unwanted ingress of rain, wind, dust, and the like from the exterior of the vehicle. The weather strip prevents rain and other weather phenomena from entering the vehicle by either blocking it outright, or by preventing a portion thereof from entering and rerouting the remainder. A secondary goal of most seal structures is to prevent unintentional evacuation of interior air (e.g., heating and air conditioning), and mitigating occupant perceptible exterior vehicle noise.

The door weather strip is generally designed with a base portion for attachment to an outer periphery of the door assembly frame, and a sealing portion projecting integrally from the base portion. When the door assembly is closed or pressed shut, an internally-projecting wall of the sealing portion is pressed or abutted against a contact surface formed around a peripheral edge of the door opening in the vehicle body. The elastic nature of the weather strip and pressure between the sealing portion and contact surface effect a seal between the door opening and the door assembly. As such, structural degradation of the weather strip throughout its operational life and insufficient closing forces (i.e., low closing efforts) negatively affect the adequacy of the seal.

Most current seal structures utilized for sealing opposing surfaces, such as vehicle door assemblies, are generally passive; that is, other than innate changes in modulus of the seal material due to environmental stimuli, the stiffness and cross-sectional geometries are unchangeable. Active materials include those compositions having certain properties, such as stiffness, shape, and dimension, that can be selectively altered through the introduction of an external stimulus. The external stimuli, more commonly referred to as an "activation signal", may include, but is not limited to, external stresses, temperature, moisture, and pH changes, and electric or magnetic fields, depending upon the type of active material.

Shape memory materials, sometimes referred to in the art as smart materials, refer to materials or compositions that have the ability to "remember" their original shape, which can subsequently be "recalled" by applying an external stimulus (i.e., an activation signal). As such, deformation of the shape memory material from the original shape can be a temporary condition. These capabilities are due, in part, to a temperature-dependent martensitic phase transformation from a low-symmetry to a highly symmetric crystallographic structure. These crystal structures are known as martensite (at lower temperatures) and austenite (at higher temperatures). Shape memory materials such as shape memory alloys (SMAs) and shape memory polymers (SMPs) represent a class of thermally-activated smart materials (TASMs) that undergo a reversible phase transformation responsible for stress-induced and temperature-induced recoverable deformation behavior.

SUMMARY OF THE INVENTION

Disclosed herein are shape memory polymer seal structures for use with motor vehicle closure assemblies to provide a weather resistant barrier and mitigate occupant perceptible exterior vehicle noise with minimal closing effort. An intelligent seal structure according to the present invention eliminates the need for individualized modifications of the regions around the periphery of the door assembly by providing an adjustable section profile. In addition, by simplifying the overall design, seal structures according to the present invention can be applied across various vehicle platforms with minimal or no alterations. As such, the present invention offers improved perceptual quality, thus achieving higher customer satisfaction, as well as cost and time savings.

According to one preferred embodiment, a door assembly with a thermally-activated smart material seal is provided for use with a motorized vehicle. The door assembly includes a frame member configured for attachment to the vehicle body to selectively transition from a closed position, in which the frame member at least partially covers a door opening, to an open position, in which the frame member provides for access to an interior of the vehicle. The seal structure includes a base portion elongated along and attached to a peripheral edge of the frame member or the door opening, and a flexible contact portion extending integrally from the base portion and configured for sealing communication with an opposing surface. A thermally-activated smart material (TASM), preferably a shape memory polymer material, is disposed inside a cavity within the contact portion. An activation device is in thermal communication with the TASM and configured to impart a thermal differential thereto. The TASM is activated in response to the thermal differential of the activation device, thereby altering at least one physical property of the TASM. Ideally, the seal structure has a cross-sectional area that increases or decreases in response to the thermal differential.

Ideally, the vehicle door assembly of the present embodiment also includes a controller in operative communication with the activation device. The controller is configured to selectively control the thermal differential of the activation device. It is further preferred that one or more sensor devices be placed in operative communication with the flexible contact portion of the seal structure and the controller. In this regard, each sensor is configured to detect a compression load between the flexible contact portion and the opposing surface, and transmit signals indicative thereof to the controller. Accordingly, the controller selectively modifies the thermal differential of the activation device based, at least in part, upon the sensor signals such that the compression load is equal to a predetermined seal force when the frame member is in the closed position. The controller can also be configured to systematically modify the thermal differential to compensate for structural changes in the seal structure that is attributable to, for example, aging and environmental changes. The controller can be even further configured to selectively individually modify the thermal differential of the activation device along predetermined segments which require extra range seal control.

It is desired that the seal structure extends continuously about the peripheral edge of the frame member/door opening. In this instance, the seal structure cross-sectional area is constant along the entire length thereof when the frame member is in the open position. The thermally-activated smart material and activation device are preferably distributed along the entire length of the flexible contact portion.

In accordance with one aspect of the present embodiment, the base portion includes first and second opposing wall members respectively including first and second pluralities of clamping lips extending therefrom. Each plurality of clamping lips extends inward between the first and second wall members, and is configured to clamp the base portion to the peripheral edge. The flexible contact portion preferably comprises a tubular body, and the cavity comprises first and second laterally opposing oblong channels. Alternatively, the flexible contact portion comprises a first arcuate lip portion opposing a second arcuate lip portion to define the cavity therebetween. In this particular instance, the door assembly preferably includes a window member slidably attached to the frame member to selectively transition from a first position to a second position. Activation of the thermally-activated smart material forces the first arcuate lip portion into sealing communication with the window member when in either the first or second position.

According to another preferred embodiment, a door assembly with a shape memory polymer seal is provided for use with a motorized vehicle. The door assembly includes a frame member configured for attachment to the vehicle body to selectively transition from a closed position, in which the frame member at least partially covers a door opening formed in the vehicle body, to an open position, in which the frame member provides for access to an interior of the vehicle. The seal structure includes a base portion elongated along and attached to a peripheral edge of either the frame member or the door opening, and a flexible contact portion extending integrally from the base portion and configured for sealing communication with an opposing surface. A plurality of shape memory polymer members, each characterized by an elongated shape, is disposed inside a cavity within the flexible contact portion. A plurality of thermoelectric devices, each characterized by a thermal differential when current flows therethrough, is each in thermal communication with a respective one of the shape memory polymer members. The seal structure has a cross-sectional area that increases or decreases in response to the thermal differential of each thermoelectric device.

A controller is in operative communication with the plurality of thermoelectric devices, and configured to selectively control the thermal differential of each thermoelectric device. One or more sensors are in operative communication with the flexible contact portion and the controller. Each sensor is configured to detect a compression load between the flexible contact portion and the opposing surface, and to transmit signals indicative thereof to the controller. The controller individually modifies the thermal differential of each thermoelectric device based, at least in part, upon the sensor signals such that the compression load is equal to a predetermined seal force along the entire length of the seal structure when the frame member is in the closed position.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
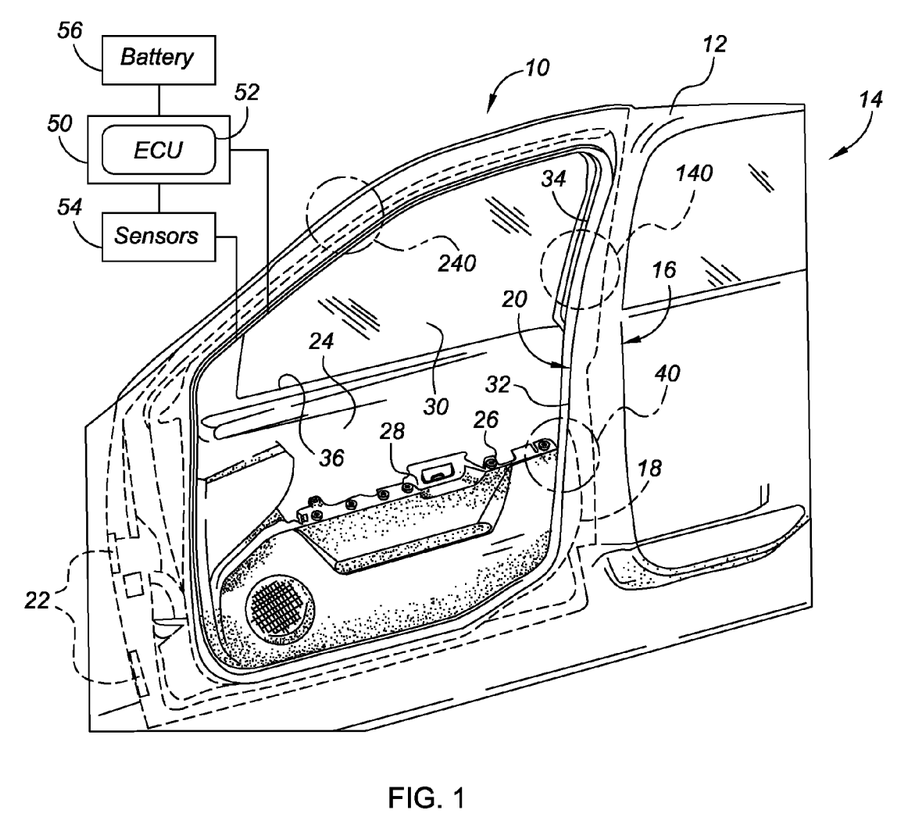
FIG. 1 is perspective view of a portion of an exemplary motorized vehicle having a door assembly with a shape memory polymer seal in accordance with the present invention mounted thereto.

Referring to the drawings, wherein like reference numbers refer to the same or similar components throughout the several views, FIG. 1 is a side perspective view of a portion of a representative motorized vehicle, identified generally as 10, with which the present invention may be practiced. It should be readily understood that FIG. 1 is merely an exemplary application by which the present invention may be incorporated; the present invention is by no means limited to the particular configuration of FIG. 1. As such, the vehicle 10 of FIG. 1 can be any vehicle platform, such as, but not limited to, sedan- or coupe-type passenger cars, light trucks, heavy duty vehicles, minivans, buses, etc. Furthermore, it is contemplated that the present invention can be employed for various non-automotive interfaces, such as airplanes, boats, trains, and the like.

The vehicle 10 has a vehicle body 12 including a vehicle interior, shown in part in FIG. 1 as passenger compartment 14. The vehicle 10 includes a number of closure assemblies, depicted in FIG. 1 in an exemplary embodiment as passenger door 16 (only one of which is shown). Each door assembly 16 includes an inner frame member, shown hidden in FIG. 1 at 18, that is operatively secured to the vehicle body 12 in a manner sufficient to allow the vehicle door assembly 16 to transition from a substantially closed position (shown in FIG. 1), in which the frame member 18 at least partially covers a door opening 20, to a generally open position (not shown), in which the frame member 18 provides for access to the interior 14 of the vehicle 10, e.g., via vertical hinges 22 or by a mechanical or automated track-and-sled mechanism (not depicted herein).

The vehicle door assembly 16 also includes a door trim assembly 24 mounted to the frame member 18 immediately adjacent the passenger compartment 14. The door frame member 18 can be covered by a foam material or padding (not shown), followed by the door trim assembly 24, which in turn is covered, for example, by a decorative cloth, leather, or vinyl. An armrest assembly 26 is preferably mounted to, or integrally formed with, the door trim assembly 24. The armrest assembly 26 includes a pull-cup feature 28, which is oriented laterally inboard relative to the vehicle 10.

The frame member 18 defines a window opening 36 therethrough. To this regard, a window member or glass panel 30 is slidably attached to the frame member 18, between the frame member 18 and door trim assembly 24 or a door outer panel (not shown). The window member 30 is configured to selectively transition from a first, closed position, in which the window member 30 substantially obstructs or blocks opening 36 (as shown in FIG. 1), to a second, at least partially open position (not illustrated herein). For example, the window 30 may be connected to a window motor (not shown) adapted for controlling transition of the window 30 between the first and second positions. Alternatively, a conventional hand-crank mechanism (not shown) can be utilized, if desired.

Still referring to FIG. 1, a shape memory polymer seal structure (also referred to herein as "seal structure" or just "seal") is shown intermediate various opposing surfaces. Specifically, a seal structure 40 according to one preferred embodiment of the present invention is attached to an inner peripheral edge 32 of the vehicle door opening 20, as will be described in extensive detail hereinbelow with respect to FIGS. 2A through 2D. In addition, a seal structure 140 according to another preferred embodiment of the present invention is attached to an inner peripheral edge 34 of the frame member 18, as will be described hereinbelow with respect to FIGS. 3A and 3B. Finally, a seal structure 240 according to yet another preferred embodiment of the present invention is attached to an inner peripheral edge of the vehicle body 12—namely, a retractable convertible top 280 of FIG. 4A, as will be described in detail hereinbelow with respect to FIGS. 4A and 4B.

Activation of the seal structure 40 is managed, at least in part, by a control system having a controller, which is depicted in a representative embodiment in FIG. 1 as a microprocessor based electronic control unit (ECU) 50 having a suitable amount of programmable memory 52. The control system also includes one or more sensing mechanisms, represented herein by sensors 54, connected to the ECU 50 and configured to continuously monitor, detect, or track various system parameters. For example, the sensors 54 are preferably in operative communication with a flexible contact portion 42 (FIGS. 2A and 2B) of the seal structure 40 and the controller 50, and configured to detect a compression load between the flexible contact portion 42 and a surface 60 in opposing, sealing communication therewith. Correspondingly, the sensors 54 are also configured to transmit signals to the ECU 50 indicative of the aforementioned parameters being monitored, tracked, or detected. The means of communication between the sensors 54 and ECU 50 may include, but is not limited to, electric cables ("by wire"), radio frequency and other wireless technology, electromechanical communication, or fiber optic cabling.

A power source 56, such as a battery, flywheel, or motor/generator assembly, is operatively connected to the ECU 50. The power source 56 is operable, at least in part, to cause current to flow to the ECU 50 in order to provide an activation signal to the shape memory polymer seal structure, i.e., 40, 140, 240, as will be described below. For example, the power source 56 may be connected to a plurality of corresponding n- and p-type thermoelements (not shown) to create an electrical circuit within a thermoelectric activation device 74 (FIG. 2A) that is operable to heat or cool the shape memory polymer seal structure 40. For instance, when electrical current is applied in one direction, for example, the thermoelectric device 74 causes heating of the shape memory polymer seal structure 40. Contrastingly, switching polarity of the electrical current distributed by the power source 56 creates the opposite effect, and the thermoelectric device cools the shape memory polymer seal structure 40.

Figure 2A:
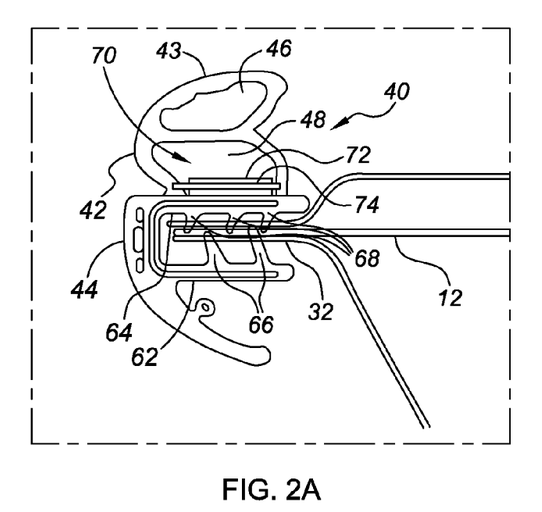
FIG. 2A is a cross-sectional view of the shape memory polymer seal of FIG. 1 in accordance with one embodiment of the present invention, depicted in an inactive or open state.

Referring now to FIG. 2A, a cross-sectional view of the shape memory polymer seal structure 40 of FIG. 1 is provided. The seal structure 40 includes a base portion 44 elongated along, and operatively attached to (e.g., via press-fit, clamp-fit, adhesive, fasteners, etc.) a portion of the inner peripheral edge 32 of the door opening 20 formed in the vehicle body 12. A flexible or elastic contact portion 42 extends laterally outward and integrally from the base portion 44. The flexible contact portion 42 is configured for sealing communication with a surface 60 in opposing, sealing communication therewith (depicted in FIGS. 2A and 2B as an inner surface of the door frame member 18).

According to the embodiment of FIG. 2A, the flexible contact portion 42 comprises a tubular body 43 which defines first and second laterally opposing, oblong hollow channels or cavities 46 and 48, respectively, therein. The base portion 44 includes first and second laterally opposing wall members 62 and 64, respectively. The first wall member 62 includes a first plurality of clamping lips 66 extending integrally therefrom. Similarly, the second wall member 64 includes a second plurality of clamping lips 68 extending integrally therefrom. The first and second pluralities of clamping lips 66, 68 each extend inward between the first and second wall members 62, 64, and clamp the seal structure 40, namely base portion 44, to peripheral edge 32.

A thermally-activated smart material (TASM) actuator mechanism, indicated generally at 70, is disposed within the second hollow channel 48. The TASM actuator mechanism 70 includes a TASM material, preferably in the nature of one or more shape memory polymer (SMP) members 72, in thermal communication with a respective number of thermoelectric activation devices 74. In accordance with the embodiment of FIG. 2A, each SMP member 72 is elongated longitudinally with respect to the tubular body 43 of the flexible contact portion 42. However, the orientation of the individual SMP members 72 can be varied without departing from the intended scope of the present invention. In a similar regard, the TASM actuator mechanism 70 is shown in FIG. 2A as a generally rectangular structure. However, an elongated cylindrical shape or other elongated shape may be used as well without departing from the scope of the present invention. Finally, the TASM actuator mechanism 70, namely SMP member 72 and activation device 74, are preferably distributed along the entire length of the flexible contact portion 42.

SMP generally refers to a polymeric material that exhibits a change in a physical property, such as a shape, dimension, shape orientation, or a combination comprising at least one of the foregoing properties in combination with a change in its elastic modulus (i.e., an increase or decrease in stiffness by a factor of 30 to 200), upon application of an activation signal. SMPs may be thermoresponsive (i.e., the change in the property is effected by a thermal activation signal), photoresponsive (i.e., the change in the property is effected by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers exhibiting a "one-way" effect, wherein the SMP exhibits a single permanent shape. Upon heating the SMP above a soft segment thermal transition temperature without a stress or load imparted thereto, the permanent shape is achieved and the shape will not revert back to the temporary shape without the use of an outside stimulus. As an alternative, some SMP compositions can be prepared to exhibit a "two-way" effect, wherein the SMP exhibits two or more permanent shapes. In this instance, the SMP comprises at least two different units, each unit defining different segments within the SMP and contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature ($T_g$), respectively. The term "thermal transition temperature" is used herein to generically refer to either a $T_g$ or a melting point, depending upon whether the segment is an amorphous segment or a crystalline segment. For example, a SMP comprising (n) segments is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". If the SMP has multiple segments with the same thermal transition temperature, which is also the last transition temperature, then the SMP is said to have multiple hard segments.

When the SMP is heated above the last transition temperature, the SMP material can be imparted a permanent shape. A predetermined or permanent shape for the SMP can be set or "memorized" by subsequently cooling the SMP below that temperature. As used herein, the terms "original shape", "previously defined shape", "predetermined shape", and "permanent shape" are synonymous, and are intended to be used interchangeably. Contrastingly, a temporary shape can be set by heating the SMP to a temperature that is higher than a thermal transition temperature of any soft segment, yet less than the last transition temperature, then applying an external stress or load to deform the SMP, and thereafter cooling the SMP below the particular thermal transition temperature of the soft segment while maintaining the deforming external stress or load.

The original shape of a SMP can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

SMPs may be heated by any suitable means, such as, for example, using hot gases (e.g., air), steam, hot liquids, or electrical current (e.g., through convection). In other words, the activation means may, for example, be in the form of heat conduction from a heated element in contact with the shape memory polymer, heat convection from a heated conduit in proximity to the thermally active SMP, a hot air blower, microwave interaction, resistive heating, and the like. Contrastingly, SMPs may be cooled by any suitable means, such as, for example, by using cold gas, evaporation of a refrigerant, thermoelectric cooling, or by eliminating the heat source for a time sufficient to allow the SMP to cool down via thermodynamic heat transfer to the surrounding environment.

The activation means may be, for example, in the form of a cooled enclosure, a cooling probe having a cooled tip, a control signal to a thermoelectric unit, a cold air blower, or means for introducing a refrigerant (such as liquid nitrogen) to the proximal vicinity of the SMP.

Suitable SMPs for the present invention can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components used to form a shape memory polymer include, but are not limited to, polyphosphazenes, poly(vinal alcohols), polyamides, polyester amides, poly(amino acids)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amids, polyether esters, and copolymers thereof.

Figure 2B:
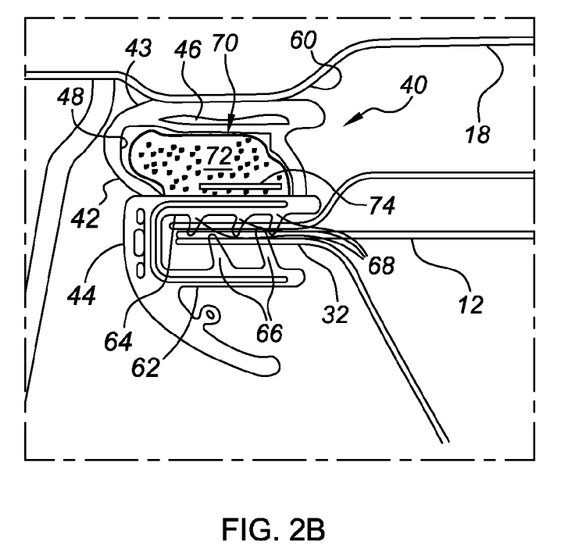
FIG. 2B is a cross-sectional view of the shape memory polymer seal of FIGS. 1 and 2A, depicted in an activated or closed state.

Referring now to FIG. 2B, the SMP seal structure 40 of FIGS. 1 and 2A is depicted in an activated or closed state. The term "activation" should be interpreted herein to indicate a signaling or triggering event provided to begin actuation (e.g., contraction, expansion, bending, or other physical change) of the TASM actuator mechanism 70. As described above, each thermoelectric activation device 74 is characterized by a thermal differential when current flows therethrough. Each SMP member 72 is "activated" in response to the thermal differential of a respective thermoelectric device 74, thereby altering at least one physical property of the SMP member 72.

Each SMP member 72 has a selected thermal transition temperature at which it undergoes a change in its modulus of elasticity and/or shape, which is manipulated by the ECU 50, in operative communication therewith. In other words, the ECU 50 is operable to selectively apply an activation signal (e.g., heat via electric convection through thermoelectric device 74) to the SMP members 72 to effect a temporary and reversible change (i.e., increase and/or decrease) in the cross-sectional area of the seal structure 40. By this means, the SMP members 72 transition from a first, inactive position, shown in FIG. 2A, to a second, activated position, shown in FIG. 2B, urging the contact portion 42 of the seal structure 40 into sealing communication with surface 60 of the door frame member 18. Ideally, the activation signal is applied to the TASM actuator mechanism 70 actively, e.g., in response to a signal from ECU 50 based upon processing of sensor inputs from sensors 54, but may also be applied in a passive manner, that is in response to environmental changes, such as differences in temperature.

The magnitude of change of the TASM actuator mechanism 70 is proportional to the magnitude of the applied activation signal. Consequently, the magnitude and speed at which the TASM actuator mechanism 70 changes can be selectively controlled or "tuned" through manipulation of the magnitude or rate of application of the activation signal. For example, each TASM actuator mechanism 70 may include a single SMP member 72 in operative communication with multiple activating devices, such as thermoelectric device 74, on different portions thereof. Alternatively, each TASM actuator mechanism 70 may include multiple SMP members 72, each with a single activating device in thermal communication therewith. Changes in the frequency of activation and in the amount of material activated could similarly provide this function.

Figure 2C:
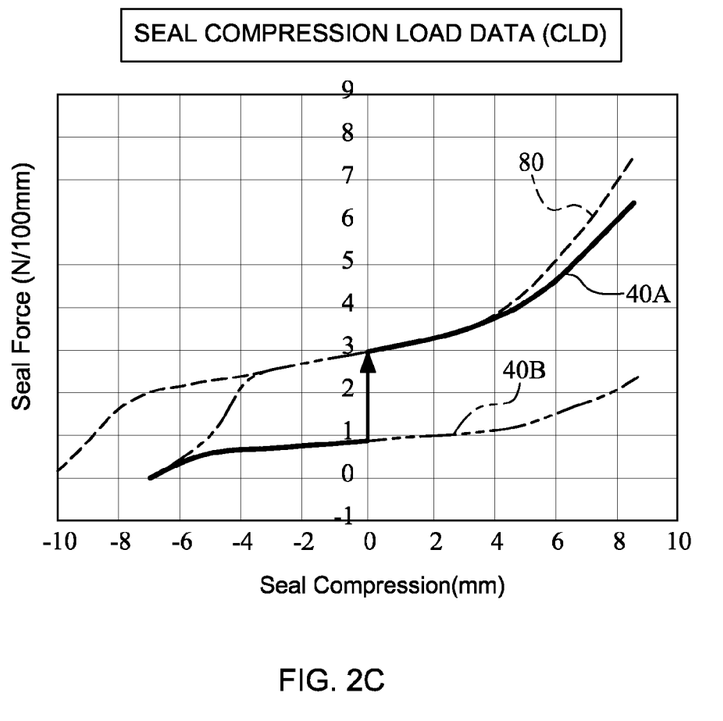
FIG. 2C is a graph of seal force vs. seal compression illustrating the improved performance characteristics achieved by the embodiment of FIGS. 2A and 2B as compared to a conventional door assembly seal structure.

FIG. 2C is a graph of seal force, in Newtons per 100 millimeters (N/100 mm), vs. seal compression (mm) illustrating the improved performance characteristics achieved by the embodiment of FIGS. 2A and 2B as compared to a conventional door assembly seal structure. The conventional seal structure, represented by dashed line 80, requires a fixed, relatively large initial compression load (i.e., high closing effort) to achieve the necessary seal force to realize a weather resistant closure and minimize occupant perceptible exterior vehicle noise. In contrast, the SMP seal structure 40 according to the present invention provides a weather resistant closure and mitigates occupant perceptible exterior vehicle noise with minimal initial closing efforts. As seen in FIG. 2C, when a door assembly, such as vehicle door assembly 16 of FIG. 1, undergoes a minimal initial compression load (i.e., low closing effort), there is a relatively nominal compression (less than 1N/100 mm) of the inactive SMP seal structure, indicated with phantom lines at 40B. Although this would be detrimental to the sealing capabilities of the conventional seal structure 80, the compression load on an intelligent SMP seal structure 40 according to the present invention can be selectively modified to achieve a predetermined seal force, as shown at line 40A in FIG. 2C.

According to a preferred practice in use of the present invention, the controller 50 selectively modifies the thermal differential of the thermoelectric activation device 74 based, at least in part, upon the detected compression load between the flexible contact portion 42 and a surface 60 in opposing, sealing communication therewith (e.g., signals from sensors 54) such that the compression load is equal to a predetermined seal force when the frame member 18 is in the closed position (FIG. 2B). In addition, the controller 50 can be configured to systematically modify (e.g., temporally, actively, etc.) the thermal differential of the thermoelectric activation device 74, thus modifying the shape and/or elastic modulus of the SMP members 72, to compensate for structural changes in the seal structure 40 attributable to, for example, aging and environmental changes.

Figure 2D:
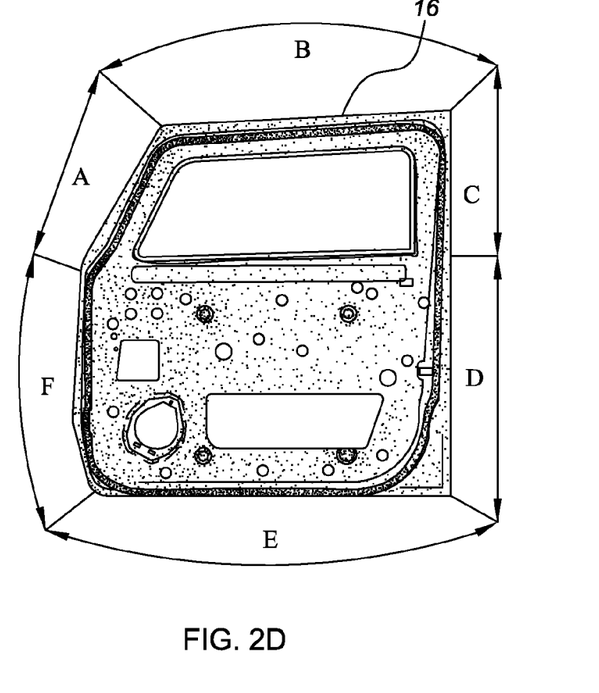
FIG. 2D is a side view of the vehicle door assembly of FIG. 1 illustrating uniformity of the shape memory polymer seal cross-section across various door seal section zones in accordance with the embodiment of FIGS. 2A-2C.

FIG. 2D is a side view of the vehicle door assembly 16 of FIG. 1. Shown in FIG. 2D is a plurality of door seal-section zones A through F. According to prior practices, certain regions of a conventional seal structure (e.g., 80 of FIG. 2C) had to be modified—i.e., the thickness, cross-section, or material characteristics varied, to accommodate the individual sealing requirements (e.g., structural variations) of each door seal-section (e.g., seal-sections A-F of FIG. 2D) of a particular door assembly for a particular vehicle platform. In contrast, an intelligent SMP seal structure 40 according to the present invention eliminates the need for individualized modifications of the regions about seal-sections A-F around the periphery of the door assembly 16 by providing an adjustable section profile. Ideally, the SMP seal structure 40 extends continuously about the inner peripheral edge 32 of the door opening 20, and the seal structure cross-sectional area is substantially constant or uniform along the entire length thereof when the frame member 18 is in the open position (FIG. 2A). By simplifying the overall design, seal structures according to the present invention can be applied across various vehicle platforms with minimal or no alterations.

Figure 3A:
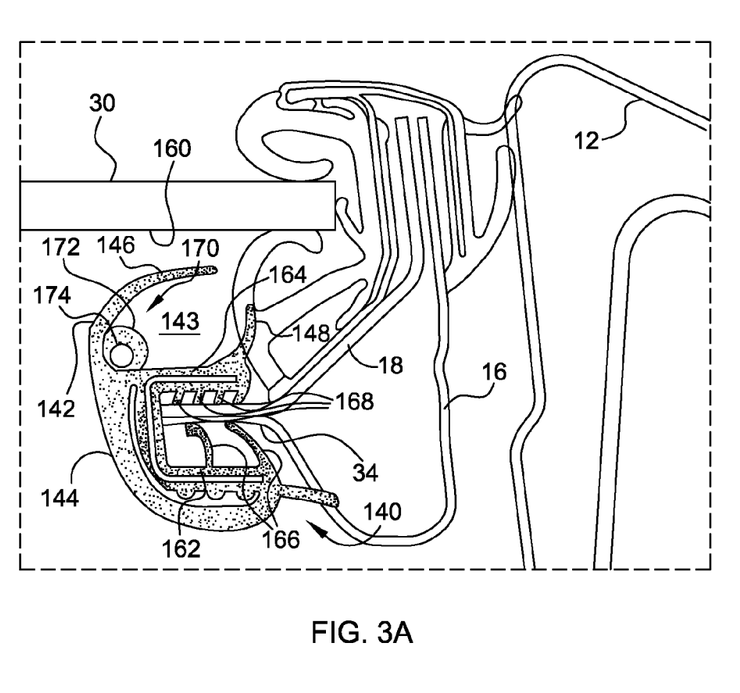
FIG. 3A is a cross-sectional view of the shape memory polymer seal of FIG. 1 in accordance with another embodiment of the present invention, depicted in an inactive or open state.

Turning to FIG. 3A, a cross-sectional view of the shape memory polymer seal 140 of FIG. 1 is depicted in an inactive or open state. The seal structure 140 includes a base portion 144 elongated along, and operatively attached to (e.g., via press-fit, clamp-fit, adhesive, fasteners, etc.) a portion of the inner peripheral edge 34 of the frame member 18. Specifically, the seal structure 140 is disposed in a substantially continuous manner about window opening 36. A flexible or elastic contact portion 142 extends laterally outward and integrally from the base portion 144. The flexible contact portion 142 is configured for sealing communication with a surface 160 in opposing, sealing communication therewith (depicted in FIGS. 3A and 3B as an inner surface of the window member 30).

According to the embodiment of FIG. 3A, the flexible contact portion 142 comprises a first arcuate lip portion 146 opposing a second arcuate lip portion 148 to define a cavity 143 therebetween. The base portion 144 includes first and second laterally opposing wall members 162 and 164, respectively. The first wall member 162 includes a first plurality of clamping lips 166 extending integrally therefrom. Similarly, the second wall member 164 includes a second plurality of clamping lips 168 extending integrally therefrom. The first and second pluralities of clamping lips 166, 168 each extend inward between the first and second wall members 162, 164, and clamp the SMP seal structure 140, namely base portion 144, to peripheral edge 34.

A thermally-activated smart material (TASM) actuator mechanism, indicated generally at 170, is disposed within the cavity 143. The TASM actuator mechanism 170 includes a TASM material, preferably in the nature of one or more shape memory polymer (SMP) members 172, in thermal communication with a respective number of activation devices 174, such as thermoelectric device 74 of FIGS. 2A and 2B. In accordance with the embodiment of FIG. 3A, each SMP member 172 is elongated longitudinally with respect to the flexible contact portion 142. However, the orientation of the individual SMP members 172 can be varied without departing from the intended scope of the present invention. In a similar regard, the TASM actuator mechanism 170 is shown in FIG. 3A as a generally cylindrical structure, but may take on other geometric configurations without departing from the scope of the present invention. Finally, the TASM actuator mechanism 170, namely SMP member 172 and activation device 174, are preferably distributed along the entire length of the flexible contact portion 142.

Figure 3B:
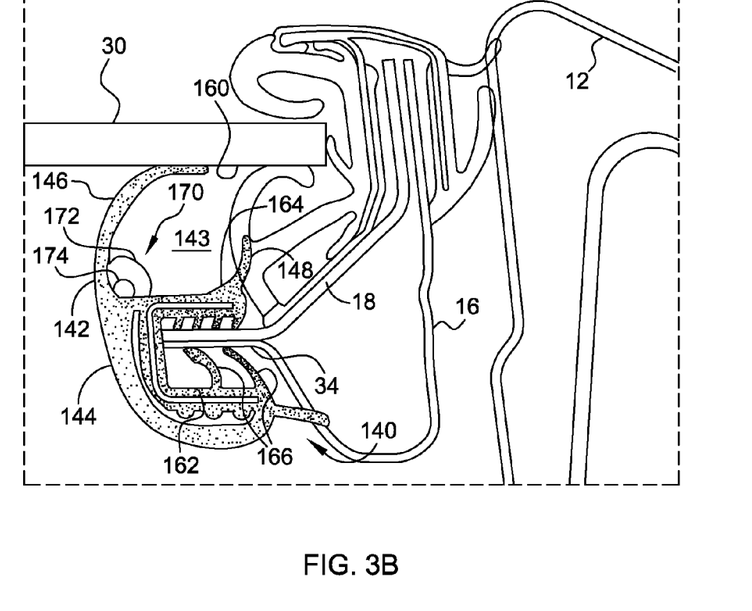
FIG. 3B is a cross-sectional view of the shape memory polymer seal of FIGS. 1 and 3A, depicted in an activated or closed state.

As seen in FIG. 3B, the SMP seal structure 140 of FIGS. 1 and 3A is depicted in an activated or closed state. Specifically, each activation device 174 is configured to impart a thermal differential to a respective SMP member 172. Correspondingly, each SMP member 172 is "activated" in response to the thermal differential of effected by thermoelectric device 174, thereby altering at least one physical property of the SMP member 172. For example, each SMP member 172, functioning similarly to the SMP member 72 of FIGS. 2A and 2B, has a selected thermal transition temperature at which it undergoes a change in its modulus of elasticity and/or shape, which is manipulated by the ECU 50, in operative communication therewith. In other words, the ECU 50 is operable to selectively apply an activation signal (e.g., heat via electric convection through thermoelectric device 174) to the SMP members 172 to temporarily and reversibly effect a change (i.e., increase and/or decrease) in the cross-sectional area of the seal structure 140. By this means, the SMP members 172 transition from a first, inactive position, shown in FIG. 3A, to a second, activated position, shown in FIG. 3B, in which the first arcuate lip portion 146 of the seal structure 140 is forced or urged into sealing communication with surface 160 of the window member 30. Ideally, the activation signal is applied to the TASM actuator mechanism 170 actively, e.g., in response to a signal from ECU 50 based upon processing of sensor inputs from sensors 54, but may also be applied in a passive manner, that is in response to environmental changes, such as differences in temperature.

Figure 4A:
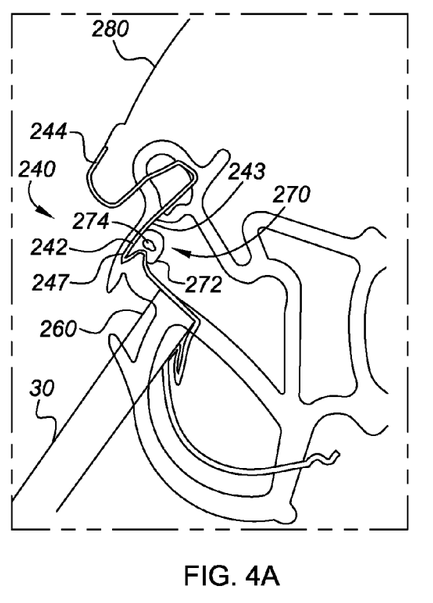
FIG. 4A is a cross-sectional view of the shape memory polymer seal of FIG. 1 in accordance with yet another embodiment of the present invention, depicted in an inactive or open state.

A cross-sectional view of the shape memory polymer seal structure 240 of FIG. 1, depicted in an inactive or open state, is provided in FIG. 4A of the drawings. The seal structure 240 includes a base portion 244 elongated along, and operatively attached to (e.g., via press-fit, clamp-fit, adhesive, fasteners, etc.) a portion of an inner peripheral edge of the vehicle body 12—namely, retractable convertible top 280. A flexible or elastic contact portion 242 extends downward and integrally from the base portion 244. The flexible contact portion 242 is configured for sealing communication with a surface 260 in opposing, sealing communication therewith (depicted in FIGS. 4A and 4B as an outer surface of the window member 30). A thermally-activated smart material (TASM) actuator mechanism, indicated generally at 270, is disposed within a cavity 243 formed inside the seal structure 240. The TASM actuator mechanism 270 includes a TASM material, preferably in the nature of one or more shape memory polymer (SMP) members 272, in thermal communication with a respective number of activation devices 274, such as thermoelectric device 74 of FIGS. 2A and 2B.

Figure 4B:
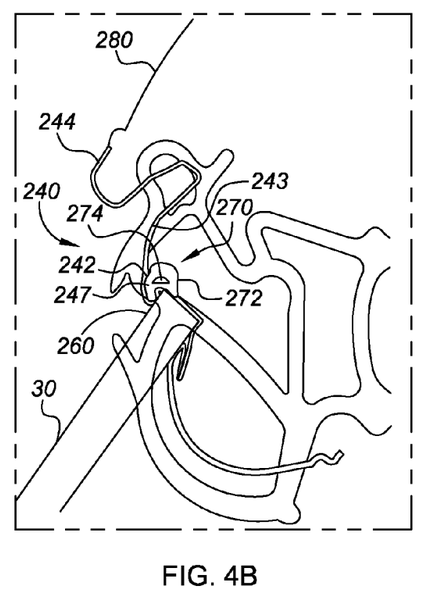
FIG. 4B is a cross-sectional view of the shape memory polymer seal of FIGS. 1 and 4A, depicted in an activated or closed state.

As seen in FIG. 4B, the SMP seal structure 240 of FIGS. 1 and 4A is depicted in an activated or closed state. Specifically, each activation device 274 is configured to impart a thermal differential to a respective SMP member 272, in any manner described hereinabove. Correspondingly, each SMP member 272 is "activated" in response to the thermal differential of effected by thermoelectric device 274, thereby altering at least one physical property of the SMP member 272. For example, each SMP member 272, functioning similarly to the SMP member 72 of FIGS. 2A and 2B, has a selected thermal transition temperature at which it undergoes a change in its modulus of elasticity and/or shape, which is manipulated by the ECU 50, in operative communication therewith. In other words, the ECU 50 is operable to selectively apply an activation signal (e.g., heat via electric convection through thermoelectric device 274) to the SMP members 272 to temporarily and reversibly effect a change (i.e., increase and/or decrease) in the cross-sectional area of the seal structure 240. By this means, the SMP members 272 transition from a first, inactive position, shown in FIG. 4A, to a second, activated position, shown in FIG. 4B, in which an arcuate lip portion 247 of the flexible contact portion 242 is forced or urged into sealing communication with surface 260 of the window member 30. Ideally, the activation signal is applied to the TASM actuator mechanism 270 actively, e.g., in response to a signal from ECU 50 based upon processing of sensor inputs from sensors 54, but may also be applied in a passive manner, that is in response to environmental changes, such as differences in temperature.

While the best modes for carrying out the invention have been described in detail, those familiar with the art to which this invention relates will recognize various alternative designs and embodiments for practicing the invention within the scope of the appended claims.

The invention claimed is:

1. A door assembly for use with a motorized vehicle having a vehicle body defining a door opening, the door assembly comprising:
   a frame member configured for operative attachment to the vehicle body to selectively transition from a closed position, in which said frame member at least partially covers the door opening, to an open position, in which said frame member provides for access to an interior of the vehicle; and
   a seal structure including:
      a base portion elongated along and operatively attached to at least a portion of a peripheral edge of one of said frame member and the vehicle body;
      a flexible contact portion having a length and extending integrally from said base portion, wherein said flexible contact portion defines a cavity and is configured for sealing communication with an opposing surface;
      a thermally-activated smart material disposed within said cavity;
      an activation device disposed within said cavity and distributed along said entire length of said flexible contact portion, wherein said activation device is in thermal communication with said thermally-activated smart material and is configured to impart a thermal differential to said thermally-activated smart material therealong; wherein said thermally-activated smart material is activated in response to said thermal differential of said activation device to reversibly alter at least one physical property of said thermally-activated smart material; and
   a controller in operative communication with said activation device and configured to selectively control and individually modify said thermal differential thereof along predetermined segments which require extra range seal control to compensate for structural changes in said seal structure attributable to aging and environmental changes.

2. The door assembly of claim 1, wherein said thermally-activated smart material is a shape memory polymer.

3. The door assembly of claim 2, wherein said seal structure has a cross-sectional area that increases or decreases in response to said thermal differential.

4. The door assembly of claim 3, further comprising:
   at least one sensor in operative communication with said flexible contact portion and said controller, said at least one sensor configured to detect a compression load between said flexible contact portion and said opposing surface and transmit signals indicative thereof to said controller.

5. The door assembly of claim 4, wherein said controller selectively modifies said thermal differential of said activation device based at least in part upon said sensor signals such that said compression load is equal to a predetermined seal force when said frame member is in said closed position.

6. The door assembly of claim 5, wherein said seal structure extends continuously about said peripheral edge, and wherein said seal structure cross-sectional area is constant along substantially the entire length thereof when said frame member is in said open position.

7. The door assembly of claim 6, wherein said base portion includes first and second opposing wall members respectively including first and second pluralities of clamping lips each extending inward between said first and second wall members and configured to clamp said base portion to said peripheral edge.

8. The door assembly of claim 7, wherein said flexible contact portion comprises a tubular body and said cavity comprises first and second laterally opposing oblong channels.

9. The door assembly of claim 7, wherein said flexible contact portion comprises a first arcuate lip portion opposing a second arcuate lip portion to define said cavity therebetween.

10. The door assembly of claim 9, further comprising:
    a window member slidably attached to said frame member and configured to selectively transition from a first position to a second position, wherein activation of said thermally-activated smart material forces said first arcuate lip portion into sealing communication with said window member when in one of said first and second positions.

11. A door assembly for use with a motorized vehicle having a vehicle body defining a door opening, the door assembly comprising:
- a frame member configured for operative attachment to the vehicle body to selectively transition from a closed position, in which said frame member at least partially covers the door opening, to an open position, in which said frame member provides for access to an interior of the vehicle; and
- a seal structure including:
  - a base portion elongated along and operatively attached to a peripheral edge of one of said frame member and the vehicle body;
  - a flexible contact portion having a length and extending integrally from said base portion, wherein said flexible contact portion defines a cavity and is configured for sealing communication with an opposing surface;
  - a shape memory polymer member disposed within said cavity; and
  - a thermoelectric device disposed within said cavity and distributed along said entire length of said flexible contact portion, wherein said thermoelectric device is in thermal communication with said shape memory polymer member and is characterized by a thermal differential when current flows therethrough; and
- a controller in operative communication with said thermoelectric device and configured to selectively control and individually modify said thermal differential thereof along predetermined segments which require extra range seal control to compensate for structural changes in said seal structure attributable to aging and environmental changes; wherein said seal structure has a cross-sectional area that reversibly increases or decreases in response to said thermal differential.

12. The door assembly of claim 11, further comprising:
- at least one sensor in operative communication with said flexible contact portion and said controller, said at least one sensor configured to detect a compression load between said flexible contact portion and said opposing surface and transmit signals indicative thereof to said controller;
- wherein said controller modifies said thermal differential of said thermoelectric device based at least in part upon said sensor signals such that said compression load is equal to a predetermined seal force when said frame member is in said closed position.

13. The door assembly of claim 11, wherein said seal structure extends continuously about said peripheral edge, and wherein said seal structure cross-sectional area is constant along the entire length thereof when said frame member is in said open position.

14. A closure assembly for use with a motorized vehicle having a vehicle body defining an opening, the closure assembly comprising
- a frame member configured for operative attachment to the vehicle body to selectively transition from a closed position, in which said frame member at least partially covers the opening, to an open position, in which said frame member provides for access to an interior of the vehicle;
- a seal structure including:
  - a base portion elongated along and operatively attached to a peripheral edge of one of said frame member and the vehicle body;
  - a flexible contact portion having a length and extending integrally from said base portion, wherein said flexible contact portion defines a cavity and is configured for sealing communication with an opposing surface;
  - a plurality of shape memory polymer members each characterized by an elongated shape and disposed within said cavity;
  - a plurality of thermoelectric devices each disposed within said cavity and distributed along said entire length of said flexible contact portion and characterized by a thermal differential when current flows therethrough, each in thermal communication with a respective one of said shape memory polymer members, said seal structure having a cross-sectional area that reversibly increases or decreases in response to said thermal differentials;
- a controller in operative communication with said plurality of thermoelectric devices and configured to selectively control said thermal differentials thereof; and
- at least one sensor in operative communication with said flexible contact portion and said controller, said at least one sensor configured to detect a compression load between said flexible contact portion and said opposing surface and transmit signals indicative thereof to said controller;
- wherein said controller individually modifies said thermal differentials of said plurality of thermoelectric devices based at least in part upon said sensor signals such that said compression load is equal to a predetermined seal force along substantially the entire length of said seal structure when said frame member is in said closed position.

* * * * *